United States Patent [19]

Quigley

[11] 4,135,150
[45] Jan. 16, 1979

[54] DECODER CIRCUIT FOR DETECTING SEQUENTIALLY PRESENTED CODE DIGIT SIGNALS

[75] Inventor: Larry L. Quigley, Piqua, Ohio

[73] Assignee: Ledex, Inc., Dayton, Ohio

[21] Appl. No.: 823,922

[22] Filed: Aug. 12, 1977

[51] Int. Cl.² ............................................. H04Q 9/14
[52] U.S. Cl. ............................ 340/167 R; 340/168 B; 340/171 R; 340/311; 179/84 VF
[58] Field of Search ........... 340/167 R, 168 B, 171 R, 340/171 PF, 311, 312; 179/84 VF; 324/78 D; 328/138, 140; 235/92 FQ

[56] References Cited

U.S. PATENT DOCUMENTS

| | | | |
|---|---|---|---|
| 3,629,847 | 12/1971 | Adlhoch | 340/167 R |
| 3,934,097 | 1/1976 | Carbrey | 328/138 X |
| 4,001,772 | 1/1977 | Powell et al. | 340/171 PF |

Primary Examiner—Donald J. Yusko
Attorney, Agent, or Firm—Biebel, French & Nauman

[57] ABSTRACT

A decoder circuit for receiving a sequence of coded digit signals and detecting when a preselected digit signal sequence is received includes a converter having a plurality of converter outputs which are energized in response to receipt of each of the coded digit signals. A plurality of digit sequence selection lines are connected to predetermined ones of the converter outputs in dependence upon the preselected digit signal sequence. A plurality of coincidence gates are provided with each of the gates responsive to one of the digit sequence selection lines. A shift register provides a means for enabling each of the coincidence gates in a sequence which corresponds to the predetermined digit sequence. The outputs of the coincidence gates are applied to the shift register shift input to cause the register to shift and enable the next gate in succession. Means are provided for detecting when each of the coincidence gates associated with the preselected digit selection lines has provided an output pulse. Additionally, ALL CALL and GROUP CALL modes of operation are provided in which less than the entire sequence of coded digit signals are needed to cause the decoder circuit to detect receipt of the digit signals.

7 Claims, 2 Drawing Figures

DECODER CIRCUIT FOR DETECTING SEQUENTIALLY PRESENTED CODE DIGIT SIGNALS

BACKGROUND OF THE INVENTION

The present invention relates to a decoder for use in communication applications and, more particularly, to a decoder which will detect transmission of a preselected sequence of digit signals, which indicate that a particular communication device is being called.

In the past communication systems have been used in which each communication unit is assigned a multi digit code. When one unit is to be called by another unit, the code for the called unit will be transmitted, typically by the dual tone technique commonly used in telephone systems, and the called unit will detect transmission of its code number and provide an indication.

A common technique for detecting dual tone transmission of a preselected number sequence has been to use tapped inductors to detect the tones. The inductor taps are selected in a given sequence matching the number of the communication unit, with each set of taps being selected after the previous tone digit is decoded. The circuit will then await the next incoming tone digit and, if the proper sequence is received, will provide an indication that the unit has been called. One difficulty with such tap inductor decoders has been the relative bulk of the inductors needed for tone detection, miniaturization therefore has remained a difficult problem.

The Mostech Corporation, 1215 W. Crosby Road, Carrollton, Tex. 75006, has, however, recently developed a monolithic integrated circuit which detects the standard dual tone frequencies used in telephone dialing and which is extremely small and light. This integrated circuit tone receiver, MK5102N provides a four bit binary output which is indicative of the digit originally transmitted. In order to take advantage of this circuit, however, to detect when the desired preselected sequence of digits for an individual communication unit has been transmitted, an additional decoder circuit must be provided. Such a decoder circuit should be relatively small and inexpensive to construct.

SUMMARY OF THE INVENTION

A decoder circuit for indicating application at a preselected sequence of digit signals at the circuit input includes a converter, responsive to the circuit input for converting each digit signal received at the circuit input to a one-of-N output on N converter output lines. Digit sequence selection lines are connected to selected ones of the converter output lines in accordance with the preselected sequence of digit signals. A shift register having a plurality of register outputs and a shift input, has an output associated with a respective one of the digit sequence selection lines. Comparator means are responsive to the register outputs and the digit sequence selection line for providing an output when a register output and its associated selection line are simultaneously energized. Means are provided for applying outputs from the comparison means to the shift register shift input. An output means is responsive to the shift register being shifted a predetermined number of times to provide an output signal indicating receipt of the preselected sequence of digit signals.

The comparator means may include a plurality of AND gates. Timing arrangements may also be provided for actuating the output means in response to the first digit signal of the preselected sequence being received at the circuit input for a predetermined period of time or, alternatively, in response to the first and second digit signals of the preselected sequence being provided at the circuit input, with the second digit signal being provided for a predetermined period of time.

Accordingly, it is an object of the present invention to provide a decoder circuit which detects transmission of a unique multiple digit code; to provide such a circuit in which a series of coincidence gates are sequentially enabled to permit the preselected sequence of digit signals to be decoded; to provide such a circuit in which a shift register sequentially enables the coincidence gates and the outputs of the coincidence gates are supplied to the shift register to effectuate shifting; and to provide such a circuit in which circuit actuation may also occur as a result of less than all of the digit signals in the preselected sequence being supplied to the circuit for predetermined periods of time.

Other objects and advantages of the invention will be apparent from the following description, the accompanying drawings and the appended claims.

DETAILED DESCRIPTION OF THE PREFERRED EMBODIMENT

Figure 1A:
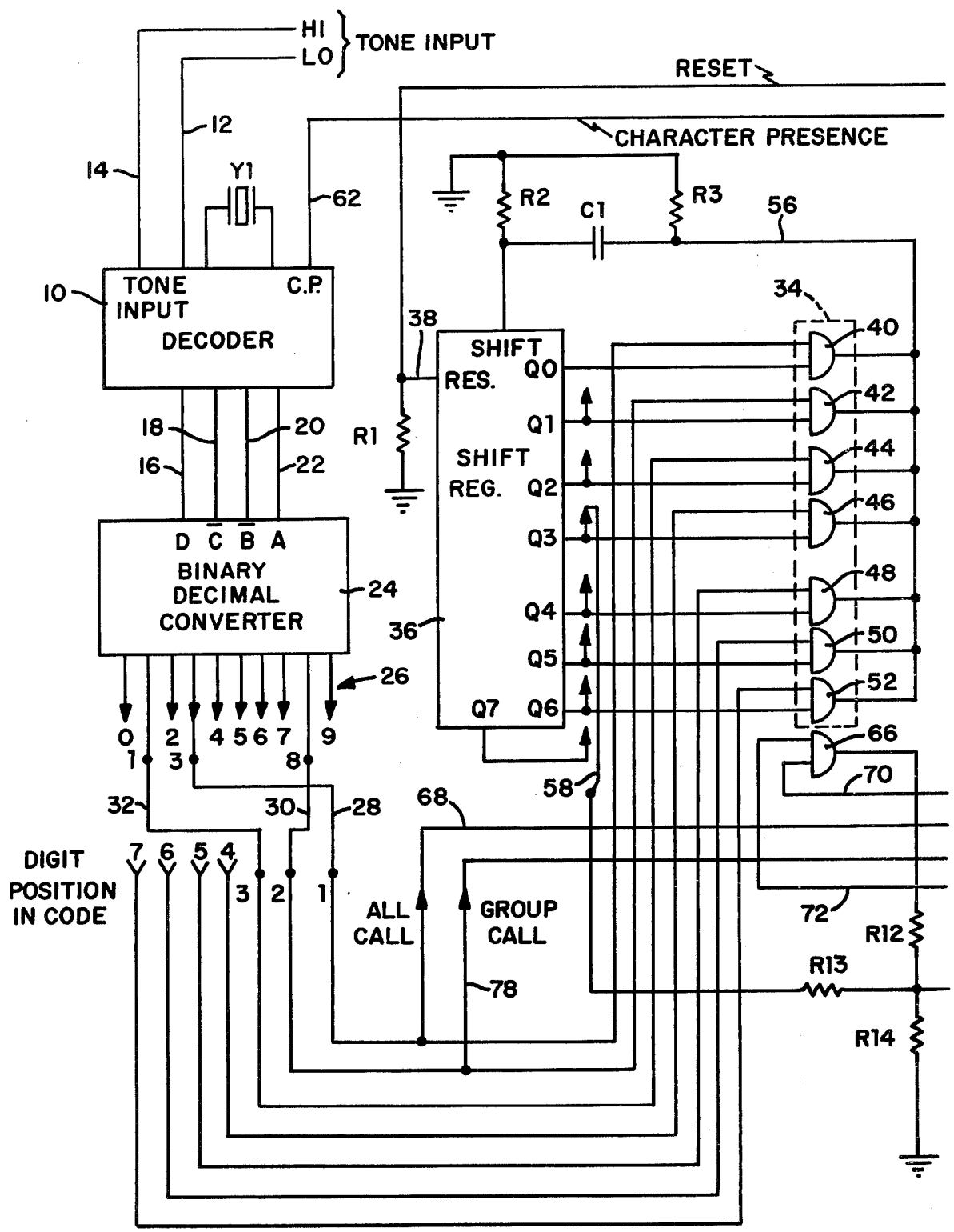
FIGS. 1A and 1B, when assembled, illustrate a decoder circuit embodying the present invention.
Figure 1B:
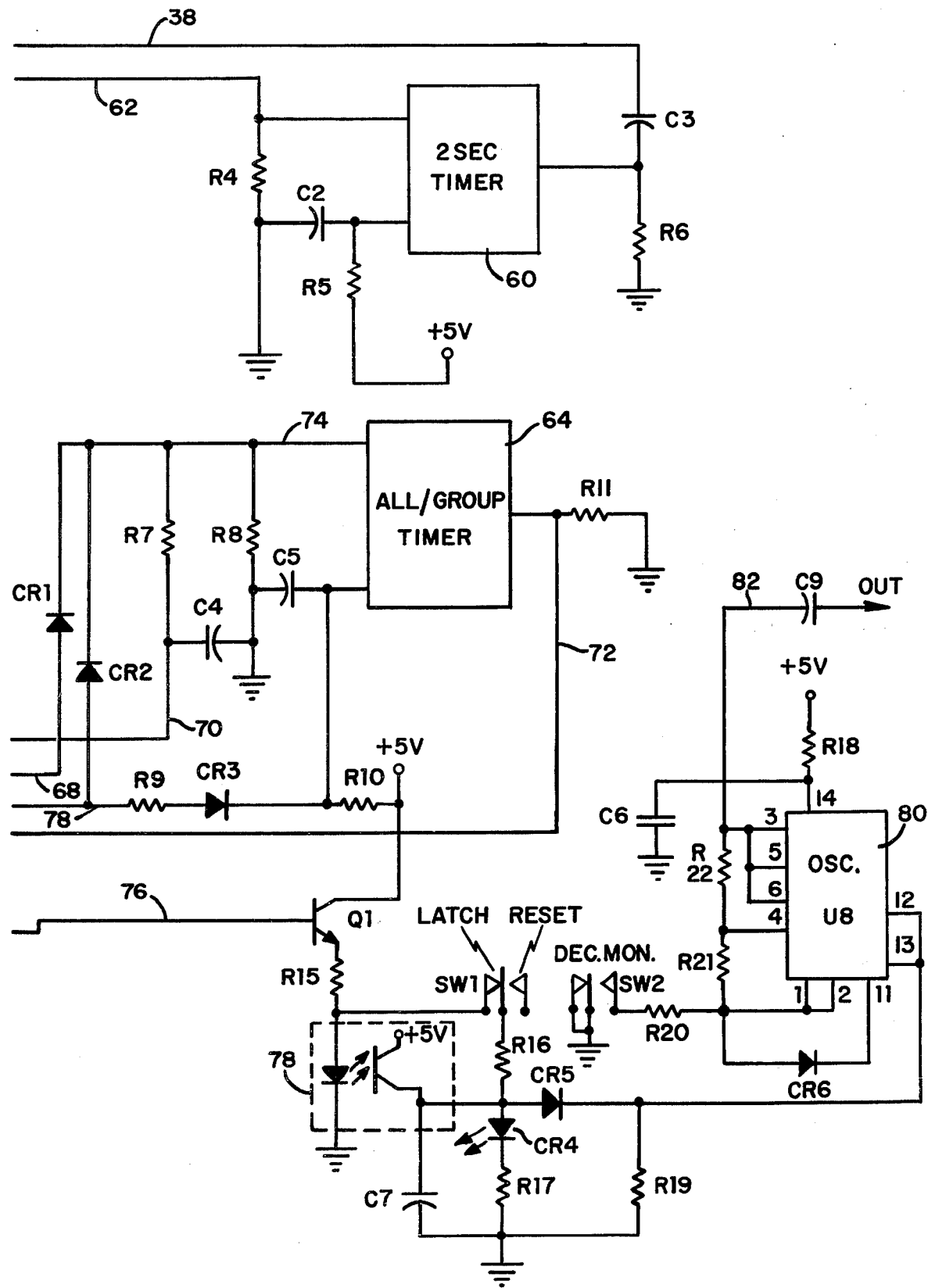

Reference is now made to FIGS. 1A and 1B which, when assembled with FIG. 1A to the left of FIG. 1B, illustrate a decoder circuit of the present invention. Circuits of the type shown will find application in a communication network in which each communication unit has associated therewith a unique multi digit code. When the code is transmitted, an indication will be provided at the unit that it is being called. The circuit shown includes a white noise oscillator, the output of which is normally fed to the noise squelch circuit of the communication unit, e.g. a hand held transceiver. The transceiver's output is silenced, therefore, until the appropriate code is detected and the oscillator deactivated.

A tone decoder 10 may typically comprise a monolithic integrated circuit, such as a MK5102N available from Mostech Corporation, 1215 W. Crosby Road, Carrollton, Tex. This circuit will receive tones on inputs 12 and 14 and decode these tones such that a binary number of lines 16, 18, 20 and 21 will be provided which is indicative of the encoded digit signal supplied in tone form on lines 12 and 14.

A converter means 22 is provided which converts the binary number on lines 16-22 to a one-of-ten decimal output on converter outputs 26. A plurality of digit sequence selection lines, such as lines 28, 30 and 32, are connected to selected ones of the converter output 26 in accordance with the preselected sequence of digit signals to be detected. This preselected sequence of digit signals will be uniquely determined in each communication unit by the interconnection of the sequence lines and, when detected, will result in an indication that the communication unit has been called. A number of the coincidence gates 34 act as a comparator.

A shift register 36 has a plurality of register outputs, $Q_1$, $Q_2$, $Q_3$, $Q_4$, $Q_5$, $Q_6$, and $Q_7$, and a shift input 38. A number of shift register outputs used in circuit operation are associated with respective ones of the digit sequence selection lines. Specifically, shift register output $Q_0$ is associated with selection line 28; shift register $Q_1$ is associated with selection line 30; and shift register output $Q_2$ is associated with selection line 32 in the presently illustrated circuit. The output $Q_3$ is monitored to determine when the register has been shifted through its first three shift states, as described below. The balance of the register outputs would be used only if a longer preselected sequence were to be used as the code for the communication unit.

The coincidence gates 34 may comprise AND gates 40–52 with one of three of the coincidence gates responsive to each of the digit sequence selection lines. Thus gate 40, when enabled, will provide an output upon receipt of a signal from selection line 28; gate 42 will provide an output upon receipt of a signal from selection line 30; and gate 44 will provide an output signal when enabled, upon receipt of a signal from selection line 32. The shift register 36 provides a means for enabling each of the coincidence gates in a sequence which corresponds to the predetermined digit sequence of the communication unit.

The outputs of AND gates 40–44 are applied to line 56 and, via capacitor C1 and resistors R2 and R3, to the shift input 38 of shift register 36. After the complete preselected sequence of digit signals has been received, the shift register will have been shifted a number of times equal to the number of digits in the sequence. A signal will then be applied to line 58, which in this case is responsive to the $Q_3$ output of shift register 36. A signal on line 58 indicates that the preselected sequence of digit signals have been received and that each of the coincidence gates associated with the preselected digit selection lines has provided an output pulse. The signal so applied to line 58 may be used, as described below, to remove the noise signal which is otherwise applied to the squelch circuit of the transceiver communications unit.

To minimize the number of erroneous decode indications, a timer 60 is provided and connected so that the characters received by decoder 10 be presented with no more than two seconds time delay between characters. The decoder 10 provides an output on line 62 when a character is present on lines 12 and 14. If the delay between characters exceed 2 seconds, timer 60 will time out and will provide a pulse to line 38 which will reset the shift register 36. If this delayed reset function were not provided, after some period of time presumably the random sequence of tones received would have included the preselected sequence of digit signals, perhaps with other digit signals interspersed. The timer 60 prevents the decoder from being actuated in such situations.

The detection of the sequence of digit signals is accomplished as follows. Each communication unit in the system will have assigned a unique multi digit code. This code will be wired into the decoder of the communication unit by the connection of the digit sequence selection lines on the outputs of the binary converter 24. As shown in FIG. 1, the code associated with the illustrated communication unit is 381, with the 3 output, the 8 output, and the 1 output being connected to the first, second and third AND gates 40, 42, and 44 via the appropriate digit position lines.

The shift register 36 will initially be reset to a state in which a one output will be provided on output $Q_0$, with the remaining outputs being unenergized. The AND gate 40 will therefore be enabled initially and when the first digit in the preselected sequence is detected, gate 40 will provide a shift signal to the shift input via line 56. Shift register 36 will provide a one only on the $Q_1$, thus enabling only gate 42. If the second of the preselected digit code digits is then provided to the decoder and AND gate 42 energized within the required time period, shift register 36 will again receive a shift pulse and the $Q_2$ output will go high. AND gate 44 will now be enabled and will be responsive to receipt of the third digit signal from converter 24. Assuming such digit signal is provided, the shift register 36 will be shifted by the output from gate 44 such that the $Q_3$ output will go high and a signal applied to line 58, indicating the receipt of the desired sequence of coded digits. It will be apparent that the preselected digit code for each communication unit may be varied by simply changing connections of the digit sequence selection lines 28, 30 and 32. Additionally, the number of digits in the sequence may be increased by using more sequence selection lines and by providing for the line 58 to be attached to the appropriate shift register output.

In conjunction with AND gate 66, timer 64 provides ALL CALL and GROUP CALL modes of operation. In the ALL CALL mode, the preselected digit sequence for each of the communication units in the system is assumed to have the same initial digit. This digit, when provided to the decoder 10 for a five second interval will, in turn, result in a signal being applied to line 68 for 5 seconds. Line 70 will be energized via diode CR1 and the timer 64 will provide an output on line 72 after it has received a signal continuously for a five second period on line 74. Since both lines 72 and 70 will be energized simultaneously, the AND gate 66 will supply an output to line 76, which is the same result as if the decoder circuit had received the entire preselected digit sequence.

If only a portion of the units in the communication system are to be called, the GROUP CALL feature may be used in which the initial digit in the preselected sequence is transmitted, followed by the second digit which is also common to all units in the group. When the second digit is received, line 78 will be energized and will, in turn, provide a signal to line 74 via diode CR2. Diode CR3 will be forward biased and will place resistor R9 in parallel with timing resistor R10. This parallel resistance combination will reduce the RC time constant sufficiently to cause timer 64 to time out after 3 seconds. As with the ALL CALL feature described above, AND gate 63 will be energized and will provide signal to line 76.

Whenever the sequence of coded digit signals is received or the decoder otherwise activated, as by receipt of ALL CALL or GROUP CALL information, line 76 will be energized turning on transistor $Q_1$. Power will then be applied to transistor $Q_1$ through the photo-optical coupler 78 which, in turn, will supply power to light emitting diode CR4. Coupler 78 will latch itself in through switch SW1 and the light emitting diode CR4 will thereby remain energized, even after transistor $Q_1$ is returned to its non-conducting state. Diode CR4 provides visual indication that the communication unit has been called. At the same time, a signal will be applied to oscillator 80 via diode CR5 which will disable oscillator 80 and prevent further oscillator output on line 82 to the noise squelch circuit of the communication device. The communication unit will then provide an audible output of the message being transmitted. It should be understood that the present decoder detector may be used in numerous applications and it is not limited to communication systems having the noise squelch oscillator feature described above.

A list of typical component part values for the components shown in the drawings is as follows:

| Number | Description |
|---|---|
| Y1 | 3.58 MHZ Crystal |
| 10 | Integrated Circuit, Mostek MK5102N-DTMF |
| 24 | Integrated Circuit, CD4028 BCD to Decimal |
| R1 | 100K 5% Resistor |
| R2 | 100K 5% Resistor |
| R3 | 470K 5% Resistor |
| C1 | .001 ufd Capacitor |
| 36 | Integrated Circuit, CD 4022 Shift Register |
| 34 | Integrated Circuit, Two CD4016 Quad Tx. Gates |
| R12 | 150K 5% Resistor |
| R13 | 150K 5% Resistor |
| R14 | 220K 5% Resistor |
| R4 | 100K 5% Resistor |
| R5 | 100K 5% Resistor |
| C2 | 33 ufd Tantalum Capacitor |
| 60 | Integrated Circuit,½ of 14538B Dual Timer IC |
| 64 | Integrated Circuit,½ of 14538B Dual Timer IC |
| C3 | .001 ufd Capacitor |
| R6 | 100K 5% Resistor |
| R7 | 1 Meg. 5% Resistor |
| R8 | 100K 5% Resistor |
| C4 | .1 ufd Capacitor |
| C5 | 100 ufd Tantalum Capacitor |
| CR1 | 1N914 Silicon Diode |
| CR2 | 1N914 Silicon Diode |
| CR3 | 1N914 Silicon Diode |
| R9 | 68K 5% Resistor |
| R10 | 100K 5% Resistor |
| Q1 | 2N5306 Silicon Transistor |
| R15 | 1K 5% Resistor |
| 78 | Integrated Circuit, 4N33 Optical Coupler |
| SW1 | SPDT Switch Spring Return |
| SW2 | SPDT Switch Spring Return |
| R16 | 4.7 K 5% Resistor |
| R17 | 1K 5% Resistor |
| CR4 | LED |
| CR5 | 1N914 Silicon Diode |
| R19 | 100K 5% Resistor |
| R20 | 100K 5% Resistor |
| R21 | 150K 5% Resistor |
| R11 | 470K 5% Resistor |
| R22 | 33K 5% Resistor |
| R18 | 330 ohm 5% Resistor |
| CR6 | 1N914 Silicon Diode |
| 80 | Integrated Circuit, ¼ CD4001 Quad Norgate |
| C6 | 15 ufd Tantalum Capacitor |
| C9 | .01 ufd Capacitor |

While the forms of apparatus herein described constitute preferred embodiments of the invention, it is to be noted that the invention is not limited to these precise forms of apparatus and that changes may be made therein without departing from the scope of the invention.

What is claimed is:

1. A decoder circuit for detecting the application of a preselected sequence of digit signals at the circuit input, comprising:

converter means, responsive to the circuit input, for converting each digit signal received at the circuit input to a 1-of-N output on N converter output lines, digit sequence selection lines, connected to selected ones of said converter output lines in accordance with the preselected sequence of digit signals, shift register means, having a plurality of register outputs and a shift input, each of said register outputs associated with a respective one of said digit sequence selection lines, for applying an output signal to each of said register outputs in sequence in response to the receipt of shift signals on said shift input, comparator means, responsive to the outputs of said shift register and to said digit sequence selection lines, for providing an output when a register output and its associated selection line are simultaneously energized, means for applying outputs from said comparator means to said shift register shift input, and output means responsive to said shift register being shifted a predetermined number of times to provide an output signal indicating receipt of the preselected sequence of digit signals.

2. A digit sequence detection device for detecting the sequential energization of a plurality of digit corresponding input lines in a predetermined sequence, comprising:

a plurality of coincidence gates connected to selected ones of said input lines, shift register means for sequentially enabling said coincidence gates in a sequence corresponding to the predetermined sequence, means for applying shift signals to said shift register means from said coincidence gates after detection of each selected digit in sequence by said gates, and means for providing an output signal indicating that said shift register has enabled said coincidence gates in sequence and that the predetermined sequence of input lines has been detected.

3. A decoder circuit for receiving a sequence of coded digit signals and detecting when a preselected digit signal sequence is received, comprising:

converter means for energizing one of a plurality of converter outputs in response to receipt of each of said coded digit signals, a plurality of digit sequence selection lines connected to predetermined ones of said converter outputs, a plurality of coincidence gates, each of said coincidence gates responsive to one of said digit sequence selection lines, for providing outputs, when enabled, upon receipt of a signal on the associated digit sequence selection line, means for enabling each of said coincidence gates in a sequence corresponding to the predetermined digit sequence, and means for detecting when each of said coincidence gates associated with said preselected digit selection lines has provided an output pulse, whereby receipt of the preselected digit sequence is indicated.

4. The decoder circuit of claim 3 in which said means for enabling comprises a shift register, responsive to the outputs of said coincidence gates, for shifting its output state in response to each indication of coincidence.

5. The decoder circuit of claim 4 in which said coincidence gates comprise AND gates.

6. The decoder circuit of claim 3 further comprising timer means connected to the digit sequence selection line associated with the first digit in said predetermined digit sequence for indicating when said first digit is received for a predetermined period of time.

7. The decoder circuit of claim 6 in which said timer means is further responsive to the digit sequence selection line associated with the second digit in said predetermined sequence, and in which said timer means will indicate when said second digit is received for a predetermined period of time.

* * * * *